United States Patent
Schubert et al.

(10) Patent No.: US 6,425,604 B1
(45) Date of Patent: Jul. 30, 2002

(54) VEHICLE LEVELING ASSEMBLY

(75) Inventors: Brett W. Schubert, Fort Wayne; Jeffrey K. Goodman, Mooresville, both of IN (US)

(73) Assignee: Recreational Technologies International, LLC, Logansport, IN (US)

( * ) Notice: Subject to any disclaimer, the term of this patent is extended or adjusted under 35 U.S.C. 154(b) by 0 days.

(21) Appl. No.: 09/511,531

(22) Filed: Feb. 23, 2000

Related U.S. Application Data (60) Provisional application No. 60/121,266, filed on Feb. 23, 1999.

(51) Int. Cl.[7] .................................................. B60S 9/00
(52) U.S. Cl. ........................... 280/763.1; 280/764.1; 254/425
(58) Field of Search ..................... 280/763.1, 764.1, 280/765.1, 766.1; 254/424, 425, 423, 93 VA, 419, 420

(56) References Cited

U.S. PATENT DOCUMENTS

| | | | |
|---|---|---|---|
| 1,281,275 A | * 10/1918 | Berry | 254/425 |
| 1,303,240 A | * 5/1919 | Berry | 254/425 |
| 1,398,279 A | * 11/1921 | Rapson | 254/425 |
| 1,784,428 A | * 12/1930 | Goldman | 254/423 |
| 1,893,848 A | * 1/1933 | Stevenson | 254/93 VA |
| 2,002,428 A | * 5/1935 | Black | 254/423 |
| 2,194,594 A | * 3/1940 | Halley | 254/93 VA |
| 2,237,167 A | * 4/1941 | Skavinsky | 254/423 |
| 2,431,245 A | * 11/1947 | Haig | |
| 2,442,881 A | * 6/1948 | Soskin | 254/423 |
| 3,181,891 A | 5/1965 | Moats | |
| 3,396,854 A | 8/1968 | Crisp | |
| 3,442,531 A | 5/1969 | Rutledge | |
| 3,627,268 A | * 12/1971 | Wills | 254/423 |
| 3,825,279 A | 7/1974 | Schmeichel | |
| 3,857,582 A | 12/1974 | Hartog | |
| 4,022,239 A | * 5/1977 | Schwindt | 137/119 |
| 4,061,309 A | 12/1977 | Hanser | |
| 4,067,543 A | 1/1978 | Orth et al. | |
| 4,103,869 A | 8/1978 | Mesny et al. | |
| 4,142,710 A | 3/1979 | Okuda | |
| 4,148,162 A | 4/1979 | Goodrich | |
| 4,165,861 A | 8/1979 | Hanser | |
| 4,597,584 A | 7/1986 | Hanser | |
| 4,635,904 A | 1/1987 | Whittingham | |
| 4,743,037 A | 5/1988 | Hanser | |
| 4,746,133 A | 5/1988 | Hanser et al. | |
| 4,969,631 A | 11/1990 | Whittingham | |
| 5,013,011 A | * 5/1991 | Halloway | 254/423 |
| 5,188,379 A | 2/1993 | Krause et al. | |
| 5,409,251 A | 4/1995 | Thorndyke | |
| 5,426,961 A | 6/1995 | Rimbaud et al. | |
| 5,451,080 A | 9/1995 | Kneile | |
| 5,580,095 A | 12/1996 | Fukumoto | |
| 5,711,504 A | 1/1998 | Cusimano | |
| 5,713,600 A | * 2/1998 | Harland | 280/765.1 |
| 5,826,889 A | 10/1998 | Eden | |

OTHER PUBLICATIONS

Save Time & Energy for the Activities You Enjoy with the Equalizer El–Pac Power Lifting System pamphlet, Equalizer Systems, Elkhart, Indiana (2 pages).

Hydraulic Lift Systems, Single and Dual Leg CM Series, Systems for Fifth Wheel, Gooseneck and Low Boy Trailers pamphlet, Equalizer Systems, Elkhart, Indiana (2 pages).

Straight Truck Hydraulic Lift Systems pamphlet, Equalizer Systems, Elkhart, Indiana (2 pages).

Hydraulic Lift Systems, Single Leg AM Series, Systems for Fifth Wheel, Gooseneck and Towable Trailers pamphlet, Equalizer Systems, Elkhart, Indiana (2 pages).

* cited by examiner

*Primary Examiner*—J. J. Swann
*Assistant Examiner*—Christopher Bottorff
(74) *Attorney, Agent, or Firm*—Barnes & Thornburg (57) ABSTRACT

A vehicle leveling assembly for supporting the weight of a vehicle on a ground plane having a leg extendable to same. A housing is provided adjacent a bracket and the leg to support the weight of the vehicle. In addition, a gear in operable communication with the leg is configured to move along the edge of a side panel thereby moving the leg relative to the bracket between stowed and use positions.

15 Claims, 7 Drawing Sheets

VEHICLE LEVELING ASSEMBLY

RELATED APPLICATION

The present application is based upon U.S. Provisional Application Serial No. 60/121,266, filed Feb. 23, 1999, the complete disclosure of which is hereby expressly incorporated by reference.

TECHNICAL FIELD

The present invention is directed to a leveling assembly and specifically to an assembly for leveling and stabilizing a vehicle.

BACKGROUND ART

Recreational vehicles often include a leveling system composed of a plurality of vehicle jacks affixed to various positions on the vehicle frame. These jacks level a vehicle when parked on uneven surfaces in order to establish a horizontal plane. Typically, these jacks are actuated between stowed and use positions. In the stowed position, conventional jacks having telescoping legs are retracted and folded in a compact configuration to allow movement of the vehicles. In the use position, the telescoping legs are unfolded and mechanically actuated to extend to the ground by an amount sufficient to level and stabilize the vehicle.

To support the telescoping members, conventional jacks include a bracket that is attached to the frame having vertically depending side panels appended to the telescoping legs via pivot pins. The deficiency in this design is that the weight from the vehicle is distributed from the bracket to the depending side panels of the bracket and into the pins. This weight, all being concentrated in the side panels, often cause the panels to fail. It would be desirable to provide a jack that distributes the weight of the vehicle through more than merely two pivot pins coupled to a bracket.

In addition, conventional legs are movable to a folded position generally parallel relative to the frame. This allows the telescoping legs to be stowed while the vehicle is in motion. These legs, however, employ complicated and less reliable links to fold same to the stowed position. It would be desirable to provide a more simple and reliable folding mechanism for the legs.

DISCLOSURE OF THE INVENTION

According to the following, as well as further embodiments of the present invention which will become apparent as the description thereof proceeds below, the present invention provides a vehicle leveling assembly for supporting the weight of a vehicle on a ground plane. One embodiment of the vehicle leveling assembly comprises a leg which is extendable to the ground and a bracket attached to the vehicle. A housing is provided which is positioned adjacent the bracket supporting the weight of the vehicle.

Another embodiment of the invention provides a vehicle leveling assembly having a leg extendable to the ground plane and a bracket attached to the vehicle. A side panel is appended to the bracket and has an edge with a plurality of gear teeth disposed thereon. A cogwheel is provided in communication with the leg and is configured to engage the plurality of teeth of the side panel.

A further embodiment of the present invention provides a vehicle leveling assembly also comprising a leg extendable to the ground plane and a bracket attached to the vehicle. In addition, a side panel is appended to the bracket and has an edge with a plurality of gear teeth disposed thereon. A cogwheel is provided in operable communication with the leg and is configured to engage the plurality of teeth of the side panel. This embodiment also comprises a housing attached to the leg and positioned adjacent the bracket to support the weight of the vehicle.

A still further embodiment of the present invention provides a vehicle leveling assembly comprising a leg configured to engage the ground plane and a bracket attached to the vehicle. A side panel is appended to the bracket and includes an arcuate edge. The leg is provided in operable communication with and movable about the arcuate edge.

In various embodiments of the present invention, the vehicle leveling assembly also comprises a leg movable between first and second positions. In addition, the housing may be a casting, have a cover and base portion, and may be provided adjacent the bracket when the leg is in the first position and not adjacent the bracket when the leg is in the second position. The housing may further comprise a support ridge positioned adjacent the second surface of the bracket. A fastener may be provided in the housing about which the leg is movable between first and second positions and upon which a portion of the weight of the vehicle is distributed. The leg may be a telescoping leg. A folding motor may be provided in operable communication with the cogwheel and movable relative to the edge of the side panel. A bias member or spring may be provided to bias the cogwheel cooperatively against the plurality of teeth of the side panel.

Additional features of the invention will become apparent, to those skilled in the art, upon consideration of the following detailed description exemplifying the best mode of carrying out the invention as presently perceived.

BRIEF DESCRIPTION OF DRAWINGS

The present invention will be described hereafter with reference to the attached drawings which are given as non-limiting examples only, in which.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE DRAWINGS

Figure 1:
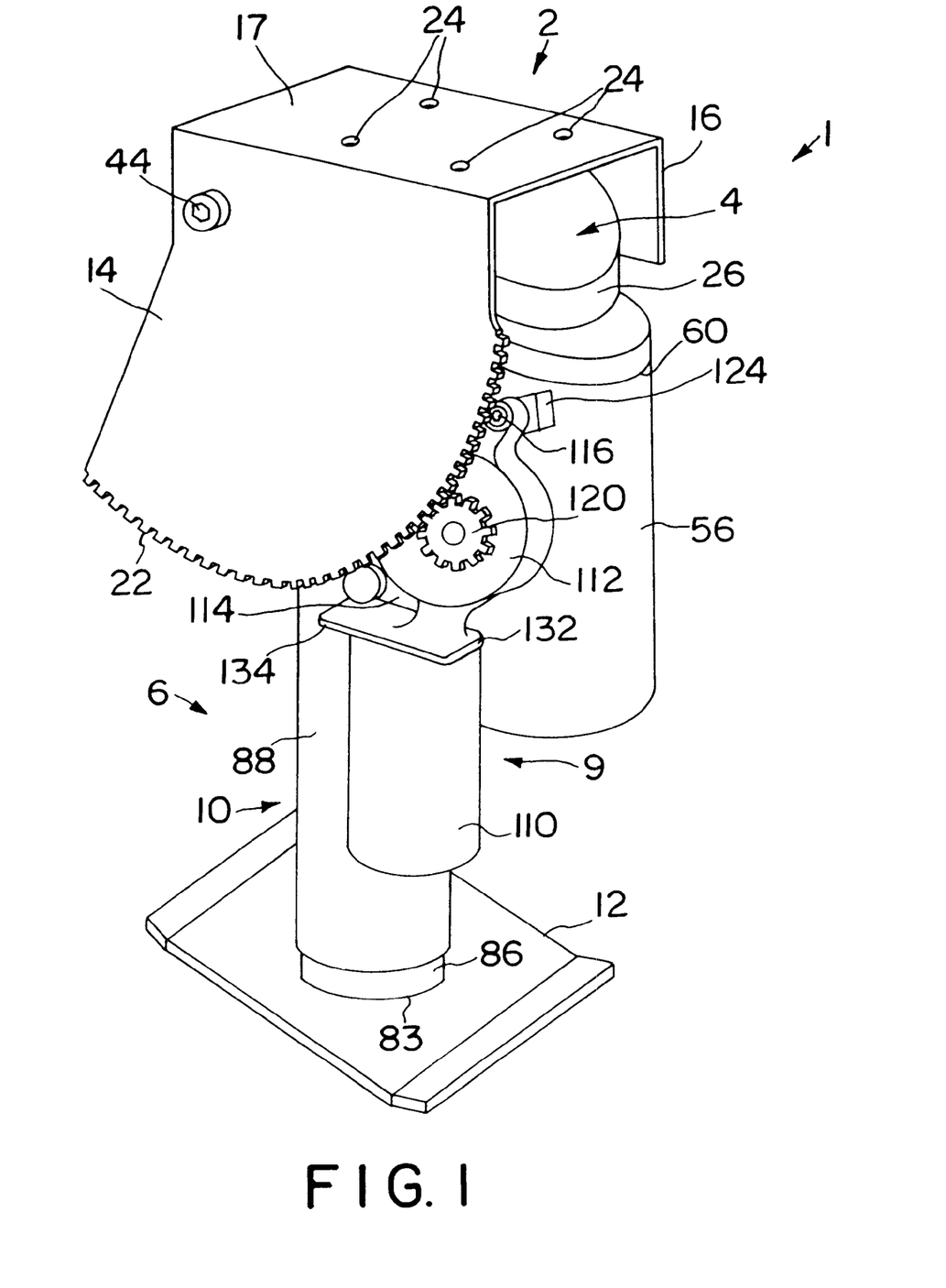
FIG. 1 a is perspective view of a vehicle leveling assembly.

Referring to the drawings, and in particular, FIG. 1 shows a vehicle leveling assembly 1 comprising a bracket 2, a gear housing 4, a leg assembly 6, a folding assembly 9, and a foot pad 12. In the illustrated embodiment, bracket 2 comprises first and second side panels 14, 16 depending from top panel 17 on opposed sides of gear housing 4. First side panel 14 includes a path of gear teeth 22 arcuately formed at the front and lowermost edge. It is appreciated that the path of gear teeth 22 will define the folding path of leg assembly 10. (See FIGS. 5 and 6.) It is appreciated that bracket 2 can be made from any suitable material including a rolled and formed metal. A plurality of apertures 24 are disposed through top panel 17. Apertures 24 are sized and positioned to allow bolts 21 or similar fasteners to extend therethrough for attaching vehicle leveling assembly 1 to the frame 130 of the vehicle (see FIG. 6).

Figure 2:
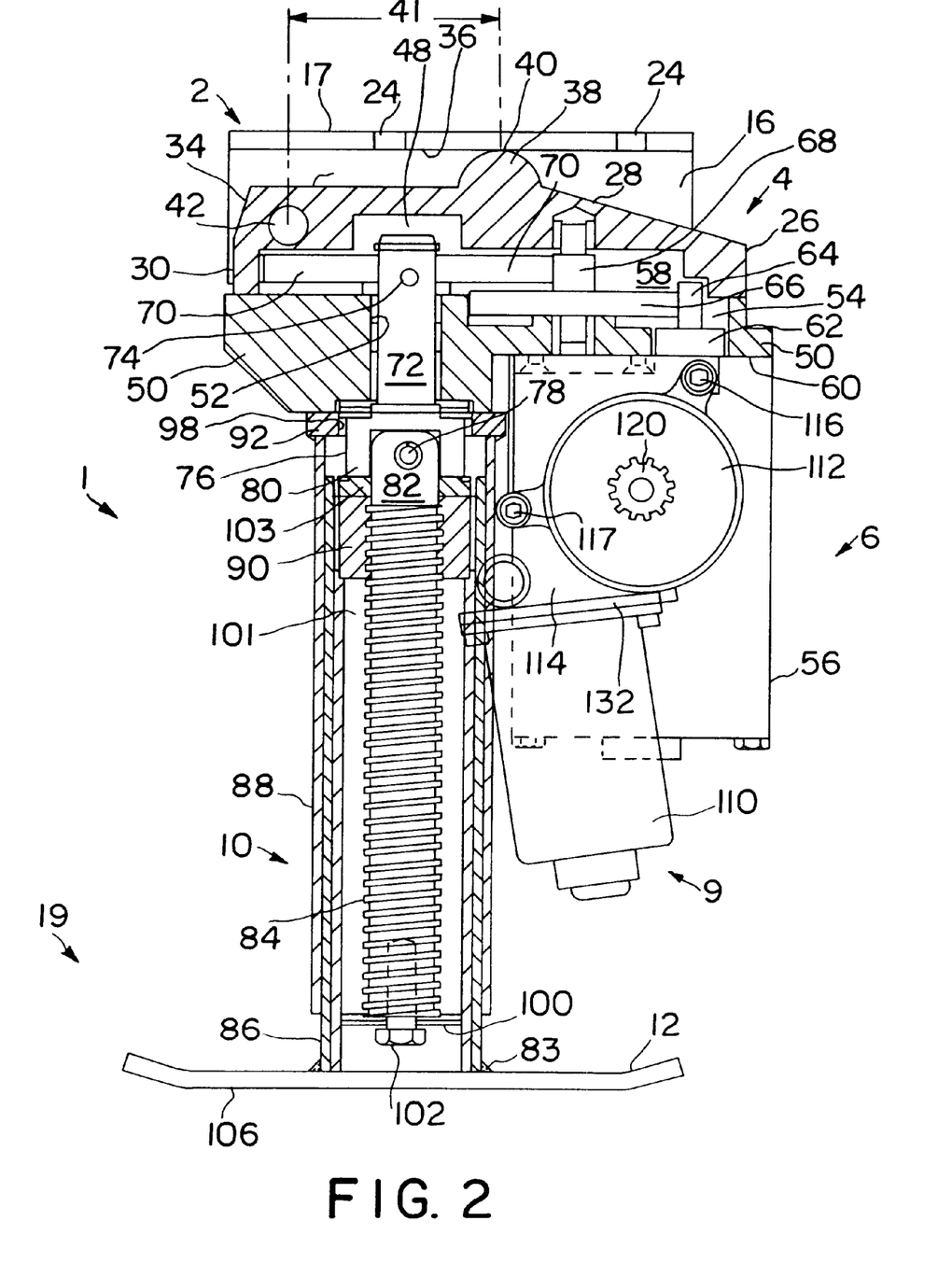
FIG. 2 a is left side partial cross-sectional view of the vehicle leveling assembly of FIG. 1.
Figure 3:
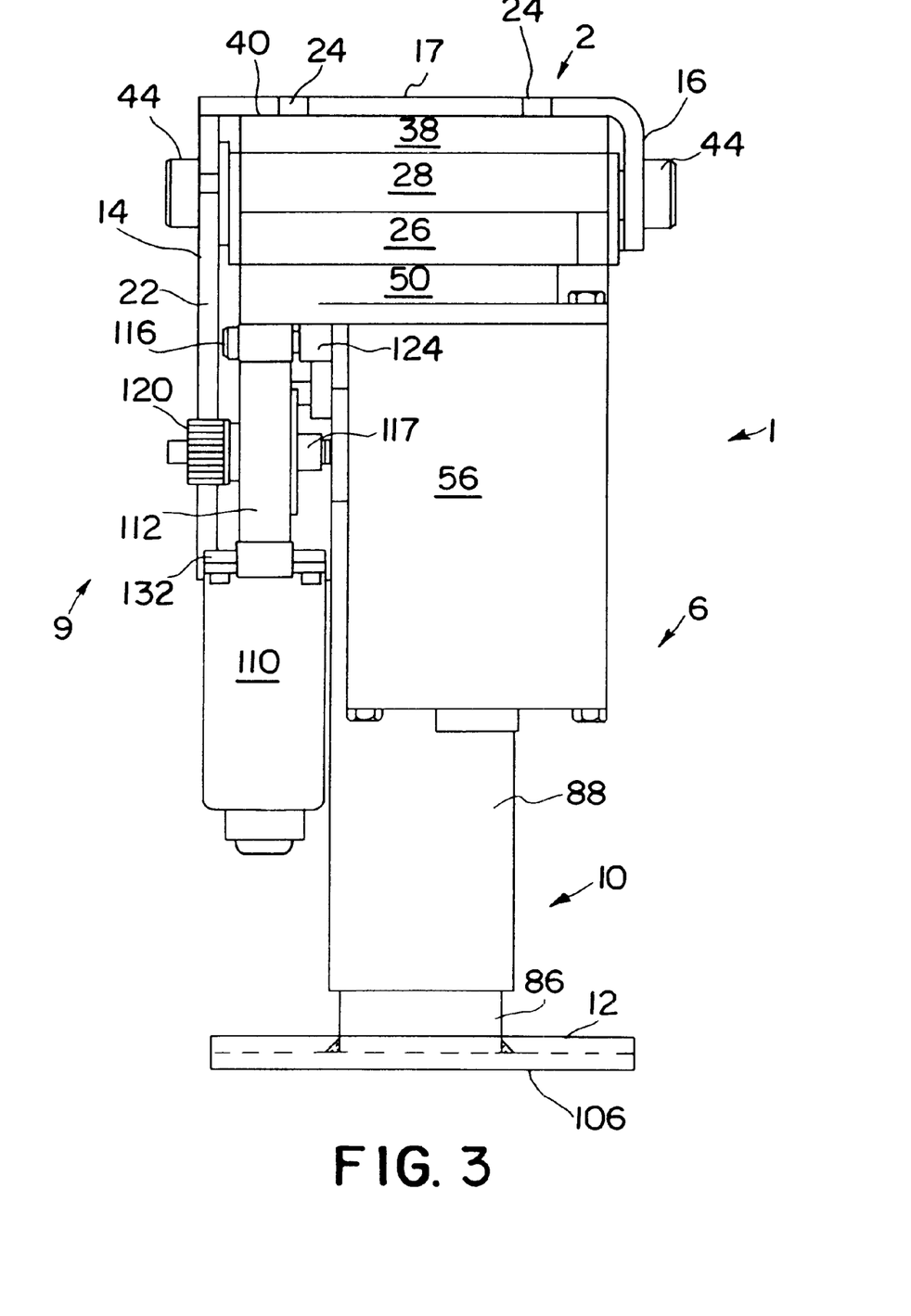
FIG. 3 is a front elevational view of the vehicle leveling assembly of FIG. 1.
Figure 5:
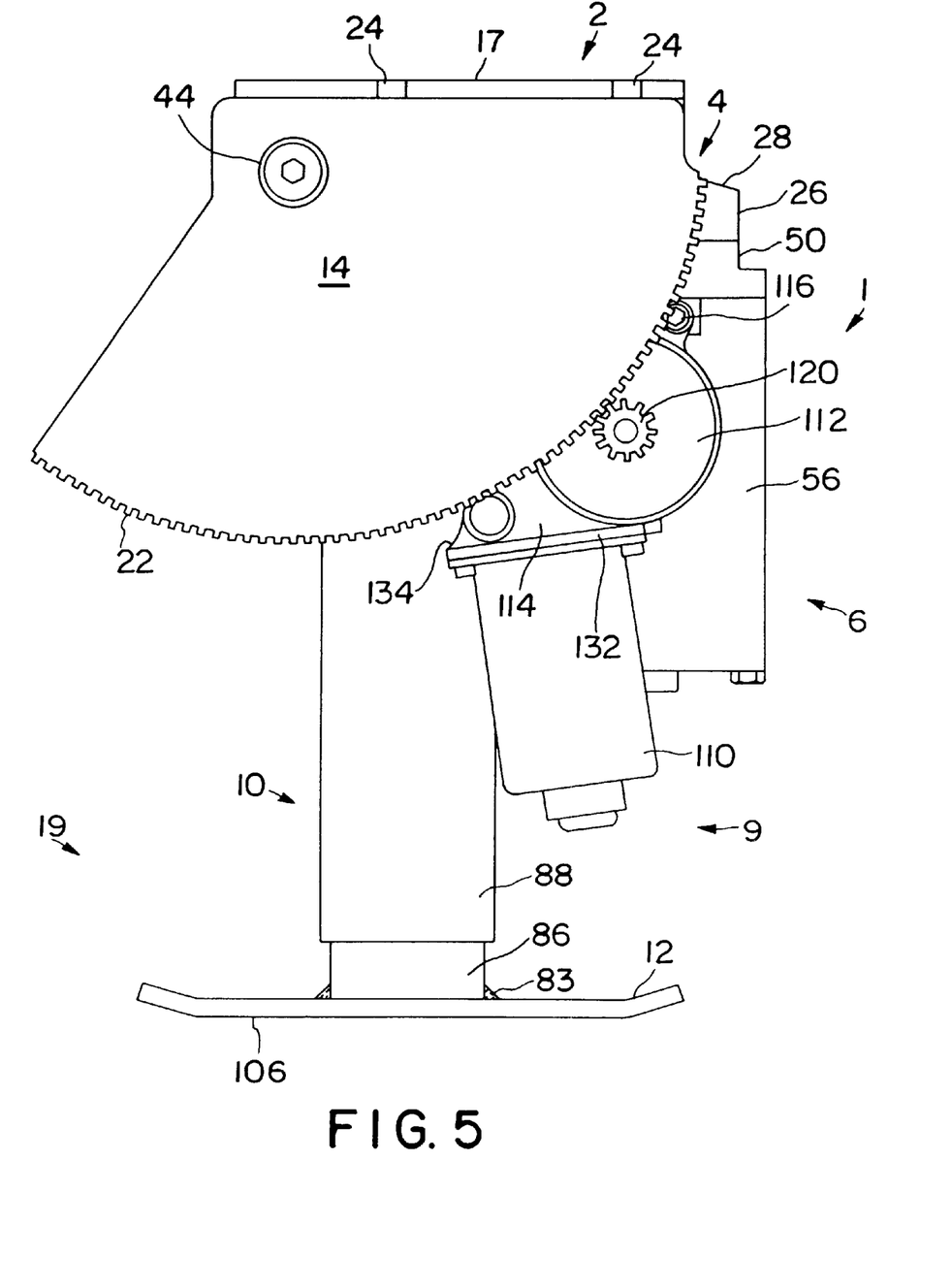
FIG. 5 is a left-side elevational view of the vehicle leveling assembly of FIG. 1.
Figure 6:
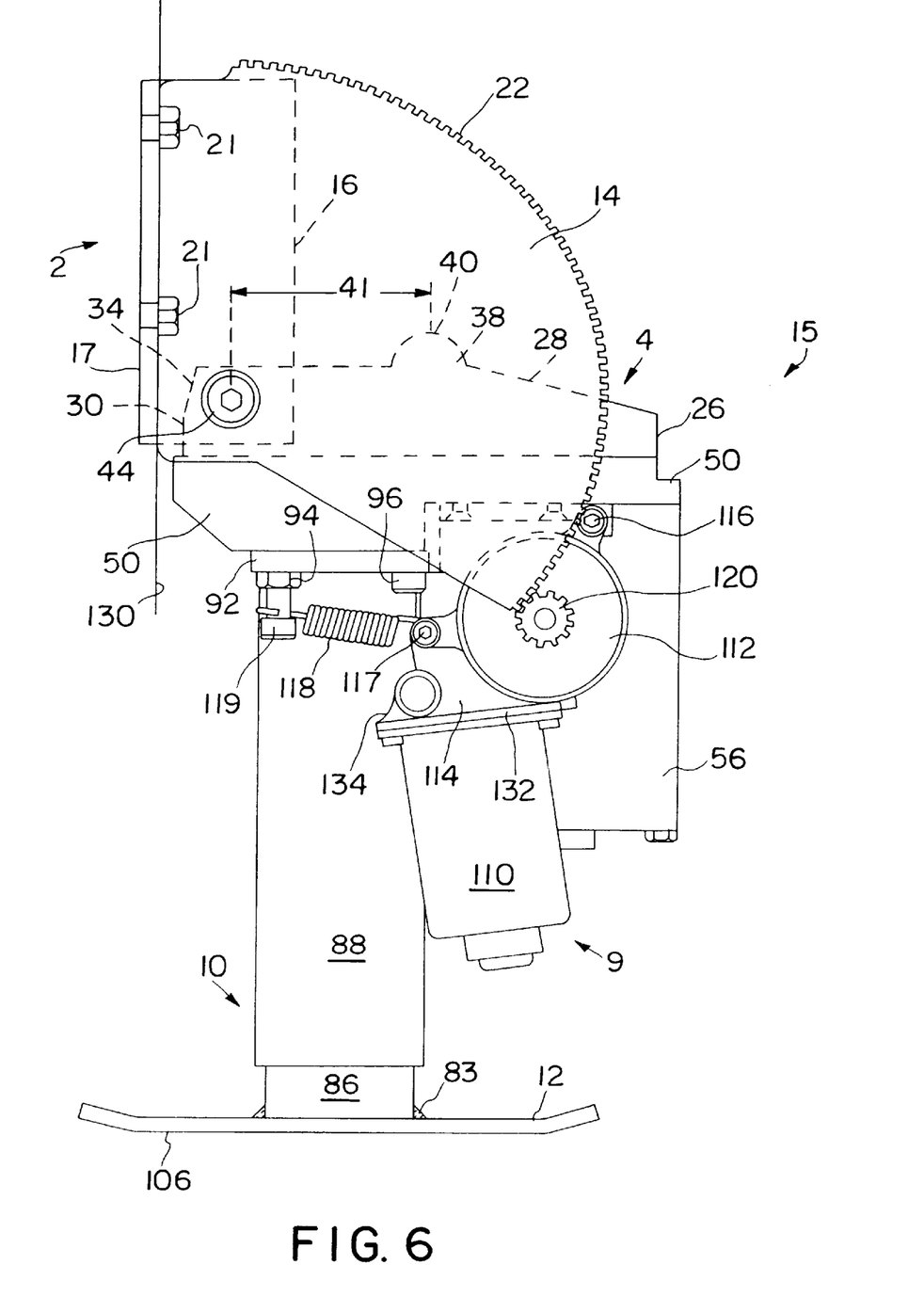
FIG. 6 is another left-side elevational view of the vehicle leveling assembly of FIG. 1.

Gear housing 4, as shown in FIG. 2, comprises a front surface 26 provided adjacent a front sloping surface 28. Rear surface 30 is provided opposite front surface 26 and adjacent top surface 32. Rear surface 30 includes a slight slope 34 allowing clearance of gear housing 4 relative to lower surface 36 of top panel 17 when moved to the folded position 15 as shown in FIG. 6. In the illustrated embodiment, a support ridge 38 is provided between front sloping surface 28 and top surface 32. While vehicle leveler assembly 1 is in use position 19 as shown for example in FIG. 2, the apex 40 of support ridge 38 is adjacent lower surface 36 of bracket 2. This allows the weight from the attached vehicle to be directed from bracket 2 to gear housing 4. As shown in FIG. 3, support ridge 38 extends the width of gear housing 4. A bore 42 is transversely disposed through gear housing 4 and sized to receive a shoulder bolt 44 illustratively extending at least the width of gear housing 4 as well. Shoulder bolt 44 also rotatably couples to side panels 14, 16 of bracket 4. This allows leg assembly 6 and folding assembly 9 to pivot relative to bracket 4 (compare FIGS. 5 and 6). It is appreciated that shoulder bolt 44 may alternatively comprise separate bolts extended through opposite ends of bore 42.

In the illustrated embodiment, weight from the vehicle is distributed through both ridge 38 and shoulder bolt 44 and into leg assembly 10. Shoulder bolt 44 and ridge 38 are spaced apart a distance indicated by reference numeral 41 such that the weight is evenly distributed on gear housing 4. It is appreciated, however, that ridge 38 can be sized and oriented in any configuration sufficient to receive weight of the vehicle.

Within gear housing 4, a gear cavity 48 is provided to receive gears that control the movement of leg assembly 10. A base 50 is provided adjacent gear housing 4 and leg assembly 10. In the illustrated embodiment, base 50 is configured with bores 52, 54 disposed into gear cavity 48 to receive various gear components. It is appreciated that base 50 may be made from cast metal for added strength.

Vehicle leveling assembly 1 includes leg assembly 6 generally defined by lifting motor 56, gear assembly 58, leg assembly 10 and pad 12. Lifting motor 56 is attached to base 50 at surface 60 and has a shaft 62 and gear 64 extending through bore 54. Gear 64 engages gear 66 which causes adjacent gear 68 to engage gear 70. Gear 70 is connected to axle 72 and illustratively secured to same by pin 74. Axle 72 is attached to a coupling 76 via pin 78 opposite gear 70. Coupling 76 is illustratively a cuff having a depending wall 80 sized to receive a cap portion 82 of an acme screw 84.

Figure 4:
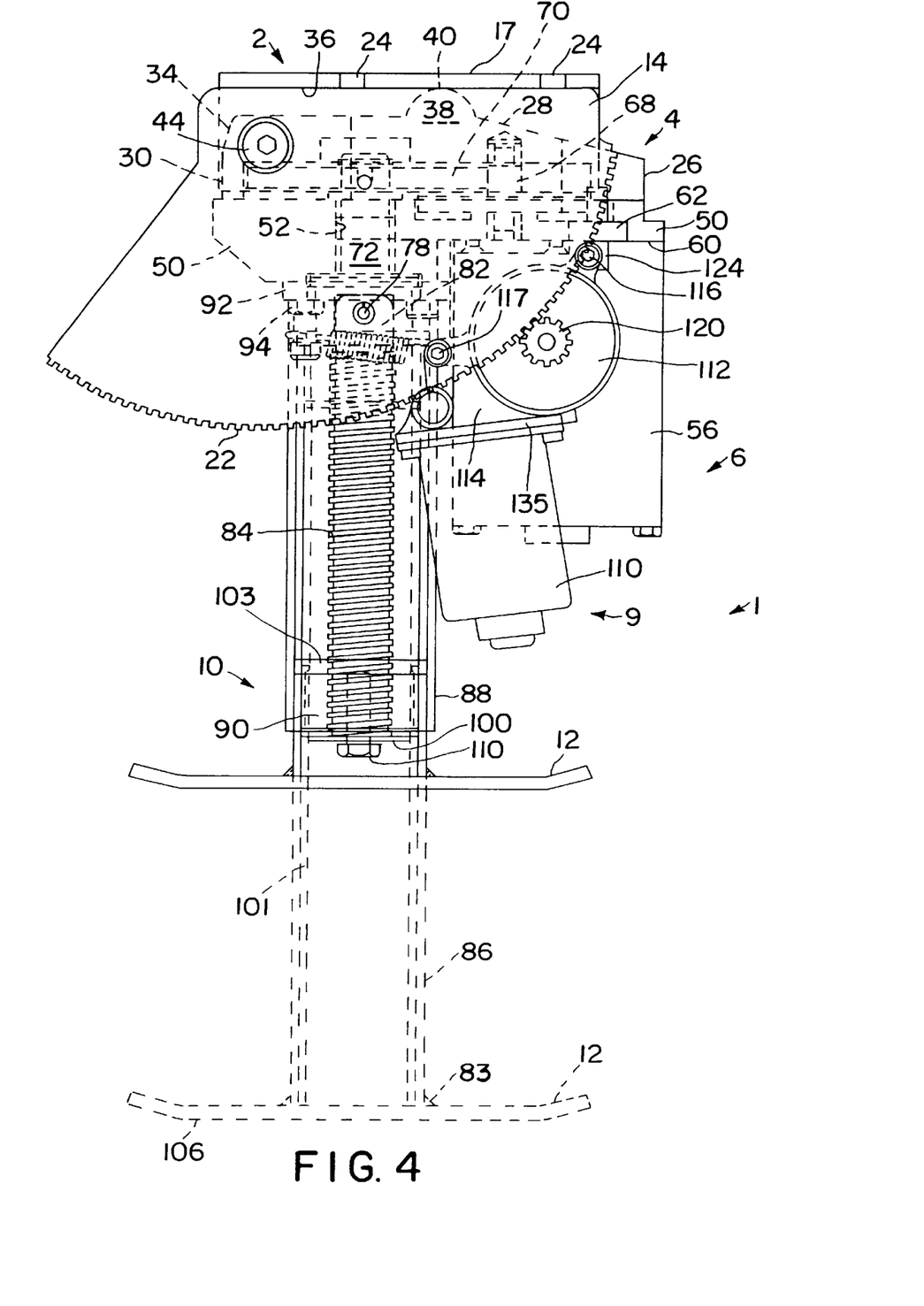
FIG. 4 is a another cross-sectional view of the vehicle leveling assembly of FIG. 1.

Acme screw 84 is provided within a telescoping housing comprising an inner cylinder member 86 provided adjacently within outer cylinder member 88. As best shown in FIG. 4, inner cylinder member 86 includes a nut 90 fixedly attached to the upper end thereof. Nut 90 has an aperture disposed therethrough, sized and threaded to receive acme screw 84. Nut 90 is also positioned adjacent a support tube 101. Support tube 101 extends from nut 90 to pad 12 to provide additional strength to assembly 1. A spring washer 103 is provided adjacent nut 90 opposite support tube 101. Spring washer 103 is a resilient member providing a biasing surface between nut 90 and coupling 76. This is to prevent motor 56 from experiencing a spike when leg 10 is withdrawn to its most retracted position.

A gasket 92 is attached to outer cylinder member 86 and coupled to base 50 via bolts 94, 96. It is appreciated that gasket 92 has an aperture 98 disposed therethrough, coaxially aligned with bore 52, and configured to receive coupling 76, as also best shown in FIG. 4. Foot pad 12 is attached to inner cylinder 86 at joint 83 opposite nut 90. Outer cylinder 88 is coaxially aligned with aperture 98 and bore 52 thus allowing operable communication to occur between acme screw 84 and gear 70.

A stopper 100 is provided on the end of jack screw 84 opposite cap portion 82. In the illustrated embodiment, a bolt 102 fastens stopper 100 to acme screw 84. Stopper 100 is configured to limit the length inner cylinder 86 can extend by engaging nut 90.

During operation, the activation of motor 56 will turn gear 64 in a particular direction. Gear 64 will cause the remainder of the gears 66, 68 and 70 to turn, thereby causing acme screw 84 to turn. As acme screw 84 turns, nut 90 is caused to reciprocally move along the shaft. When gear 64 turns in a particular direction, nut 90 is caused to move, for example, in a downward direction. Nut 90 being attached to inner cylinder 86 causes same to move also in a downward direction. Inner cylinder 86 is movable to the extent lower surface 106 of foot pad 12 contacts the ground or until nut 90 contacts stopper 100. Conversely, when gear 64 turns in the reciprocal direction, nut 90 is caused to move in an upward direction. This retracts inner cylinder 86.

In addition to being able to telescope between retracted and extended positions, vehicle leveling assembly 1 can fold between stowed and use positions. (See FIGS. 5–7.) Folding assembly 9 comprises a folding motor 110, gear housing 112, gear housing bracket 114, pivot connection 116, a spring 118, a rotatable cogwheel 120 and an arcuate path of gear teeth 22 disposed on the edge of side panel 14. It is appreciated that gear housing 112 and gear housing bracket 114 can be formed as a single integral structure. As shown in FIG. 5, for example, gear housing 112 is configured to engage gear path 22. Cogwheel 120 is rotatably attached to gear housing 112. Gear housing 112 contains various other gears (not shown) that are in operable communication with folding motor 110 causing cogwheel 120 to rotatably move along gear path 22. Gear housing 112 is attached to mounting block 124 on base 50 via pivot connection 116. Pivot connection 116 is shown to be a bolt extending laterally into block 124 and about which folding assembly 9 can rotate. (See FIG. 7.) A spring 118 is connected to both housing bracket 114 via bolt 117 and base 50 via bolt 119. Spring 118 creates a bias force on cogwheel 120 against teeth 22 to maintain contact between the two during movement of assembly 9.

During operation, folding motor 110 causes cogwheel 120 to rotate, thus, move along the path of gear teeth 22. The arcuate path of side panel 14 is configured such that travel in one particular direction moves leg assembly 6, about shoulder bolt 44, to use position 19 as shown, for example, in FIG. 2. At this point, leg assembly 10 extends to level the vehicle as previously discussed. In addition, the arcuate path of side panel 14 is also configured such that travel in the opposite direction moves leg assembly 6, about shoulder bolt 44, to stowed position 15 as shown in FIG. 6. In stowed position 15, leg assembly 10 is positioned generally parallel to vehicle frame 130. This allows the vehicle to travel without interference from the leveling assembly 1.

In the illustrated embodiment, folding assembly 9, especially folding motor 110 is positioned at a slight angle relative to leg assembly 10. In one embodiment of the invention, motor mounting block 132 is sized such that as folding assembly 9 moves along the path of teeth 22, these teeth may contact assembly 9 at about point 134 if folding motor 110 and block 132 are positioned too close to leg assembly 10. By positioning folding motor 110 and block 132 some distance away from leg assembly 10, teeth 22 will not make contact. It is appreciated, however, that the same effect can be accomplished by extending housing bracket 114 enough to provide the necessary clearance.

Figure 7:
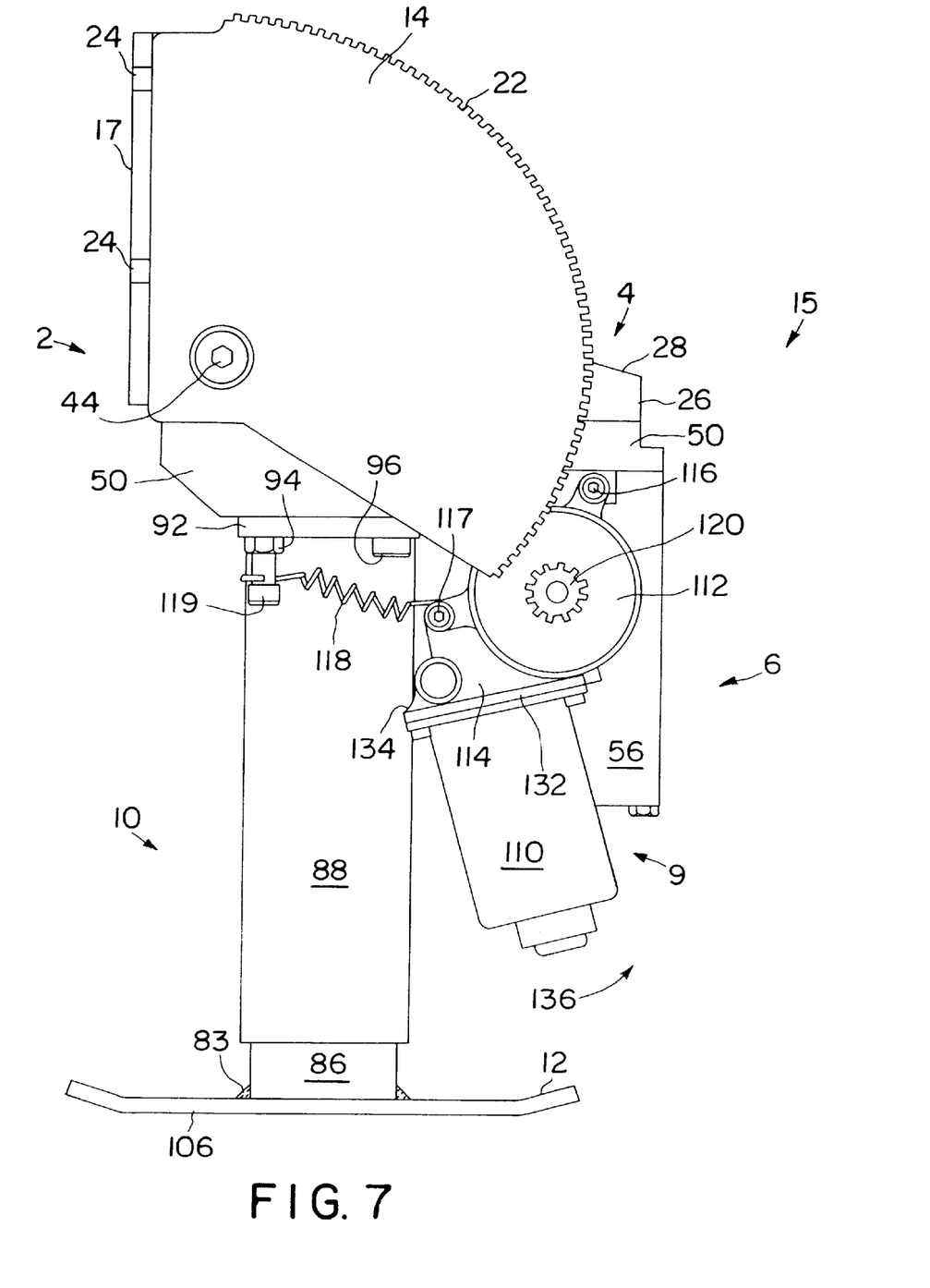
FIG. 7 is a further left-side elevational view of the vehicle leveling assembly of FIG. 1.

Folding assembly 9 is also configured to move between its stowed and use positions 15, 19 without use of cogwheel 120 or teeth 22. As shown in FIG. 7, arcuate force applied in direction 136 greater than the bias force of spring 116 can disengage cogwheel 120 from teeth 22. This allows leg assembly 6 to pivot freely about shoulder bolt 44.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as set forth in the attached claims.

What is claimed is:

1. A vehicle leveling assembly for supporting the weight of a vehicle on a ground surface, the vehicle leveling assembly comprising:

a leg having first and second ends and extendable to the ground surface at the second end;

a bracket having first and second surfaces, the first surface being attached to the vehicle, the bracket also having spaced apart first and second depending members;

a housing located between the spaced apart first and second depending members of the bracket, the housing having first and second, surfaces, said first surface attached to the first end of the leg, the housing also having a hinge that is movably coupled to the first and second depending members of the bracket;

wherein the housing and leg are movable at the hinge between lowered use and raised stowed positions;

wherein said second surface of the housing is positioned in contact with the second surface of the bracket and supports the weight of the vehicle when the leg and housing are in the lowered use position and the leg is extended to the ground surface; and wherein the hinge is spaced apart from the second surface of the bracket when the leg and housing are in the raised stowed position.

2. The vehicle leveling assembly of claim 1, wherein the leg is movable between first and second positions.

3. The vehicle leveling assembly of claim 2, wherein the second surface of the housing is adjacent the second surface of the bracket when the leg is in the first position and the second surface of the housing is not adjacent the second surface when the leg is in the second position.

4. The vehicle leveling assembly of claim 1, wherein the housing is a casting.

5. The vehicle leveling assembly of claim 2, wherein the housing comprises a cover portion and a base portion.

6. The vehicle leveling assembly of claim 1, wherein the housing further comprises a support ridge positioned adjacent the second surface of the bracket.

7. The vehicle leveling assembly of claim 1, wherein the leg is a telescoping leg.

8. The vehicle leveling assembly of claim 3, wherein the housing comprises a fastener about which the leg is movable between first and second positions and upon which a portion of the weight of the vehicle is distributed.

9. A vehicle leveling assembly for supporting the weight of a vehicle on a ground surface, the vehicle leveling assembly comprising:

a leg having first and second ends and extendable to the ground surface at the second end;

a bracket attached to the vehicle, the bracket having spaced apart first and second depending members;

an edge with a plurality of gear teeth disposed on the first depending member; and a cogwheel in communication with the leg and configured to engage the plurality of teeth of the first depending member.

10. The vehicle leveling assembly of claim 9, wherein the edge of the first depending member is an arcuate edge.

11. The vehicle leveling assembly of claim 9, further comprising a folding motor in operable communication with the cogwheel and movable relative to the edge of the first depending member.

12. The vehicle leveling assembly of claim 11, further comprising a bias member configured to bias the cogwheel cooperatively against the plurality of teeth of the first depending member.

13. The vehicle leveling assembly of claim 12, wherein the bias member is a spring.

14. A vehicle leveling assembly for supporting the weight of a vehicle on a ground surface, the vehicle leveling assembly comprising:

a leg having first and second ends and extendable to the ground surface at the second end;

a bracket having first and second surfaces, the first surface being attached to the vehicle;

a first depending member appended to the bracket and having an edge with a plurality of gear teeth disposed thereon;

a housing having first and second surfaces, said first surface attached to the first end of the leg and said second surface being positioned adjacent the second surface of the bracket; and a cogwheel in operable communication with the leg and configured to engage the plurality of teeth of the first depending member.

15. A vehicle leveling assembly for supporting the weight of a vehicle on a ground surface, the vehicle leveling assembly comprising:

a leg having first and second ends and configured to engage the ground surface at the second end;

a bracket attached to the vehicle, the bracket having first and second depending members;

wherein the first depending member comprises an arcuate edge; and said leg being in operable communication with and movable about the arcuate edge.

* * * * *